Aug. 20, 1963   A. M. LE LAN   3,101,019
LATHE TAILSTOCK DEVICE
Filed May 19, 1958   4 Sheets-Sheet 1

United States Patent Office 3,101,019
Patented Aug. 20, 1963

3,101,019
LATHE TAILSTOCK DEVICE
Armand Marcel Le Lan, Vanves, France, assignor to H. Ernault-Batignolles S.A., Paris, France, a company of France
Filed May 19, 1958, Ser. No. 736,224
Claims priority, application France May 20, 1957
3 Claims. (Cl. 82—2.5)

The invention relates to machining, on a lathe, of mechanical parts made directly from a bar, and more particularly to a device for manipulating a bar passed through the hollow spindle of a headstock.

The difficulties encountered during the machining of mechanical parts from a bar are known, particularly if the bar is relatively long. In particular, whipping of the bar is observed and it may, in addition, be subjected to flexure stresses due to the thrust of the tool. In order to overcome these disadvantages, a displaceable back-rest is frequently provided, which supports the part behind the tool, but this accessory detracts from the ease and rapidity of production and ejection of the parts.

At the same time, it is difficult to control with precision the periodic advance movements of the bar, particularly in the case where the bar is positioned by a fixed stop, because of the stub end which is left on the bar after the parting off of the machined part. In order to avoid the rejects which would result from inaccurate feed, it is necessary to provide relatively large amounts of wastage on each part to be machined.

Finally, the lateral ejection of the machined parts is incompatible with a high rate of production, and it complicates the subsequent stocking of the parts or their transfer to other machines.

One of the objects of the invention is to obtain the correct machining, on a lathe, of parts from bar, without whipping or flexure of the bar.

Another object of the invention is to effect the successive feed of the bar in a precise manner.

A further object of the invention is to eject each machined part automatically without it being necessary to have recourse to supplementary devices provided more particularly for this purpose.

It is another object of the invention to provide a manipulation process consisting in holding the bar axially by means of a rotary gripping member mounted on the frame of the lathe in the extension of the spindle, allowing it to turn on itself while it is held in the chuck, releasing the chuck, displacing the bar coaxially by a given length, by means of the said gripping member, in the direction which moves said member away from the headstock, re-closing the chuck, releasing the gripping member and returning it towards the headstock with at least one displacement through the said given length, the machining of the part being effected between the periods of displacement of the gripping member towards the headstock.

Still another object of the invention is to provide a device for carrying out the above process comprising, in combination, a support which is carried by the frame of the lathe in the geometrical axis of the spindle thereof, a gripping member for the bar, mounted in said support in such a manner as to be able to rotate and slide on the geometrical axis of the hollow lathe-spindle, said support and said gripping member being drilled axially, right through, of a diameter sufficient to permit the passage and ejection of the machined parts, means for displacing said gripping member axially and means adapted either to tighten said gripping member on the bar in order to fix thereto for axial translation, or to release it in order to release the bar therefrom.

It is obvious that with such a device it is possible to machine the parts correctly, without whipping or flexure of the bar from which they are taken, to effect the successive feed of the bar in a precise manner and to eject the machined parts automatically without recourse to devices designed specially for this purpose.

Other objects and advantages of the invention will be apparent from the following detailed description, together with the accompanying drawings submitted for purpose of illustration only and not intended to limit the scope of the invention.

In these drawings:

FIGURE 2a is a section through the free wheel mechanism along line IIa—IIa in FIG. 4.

Figure 1:
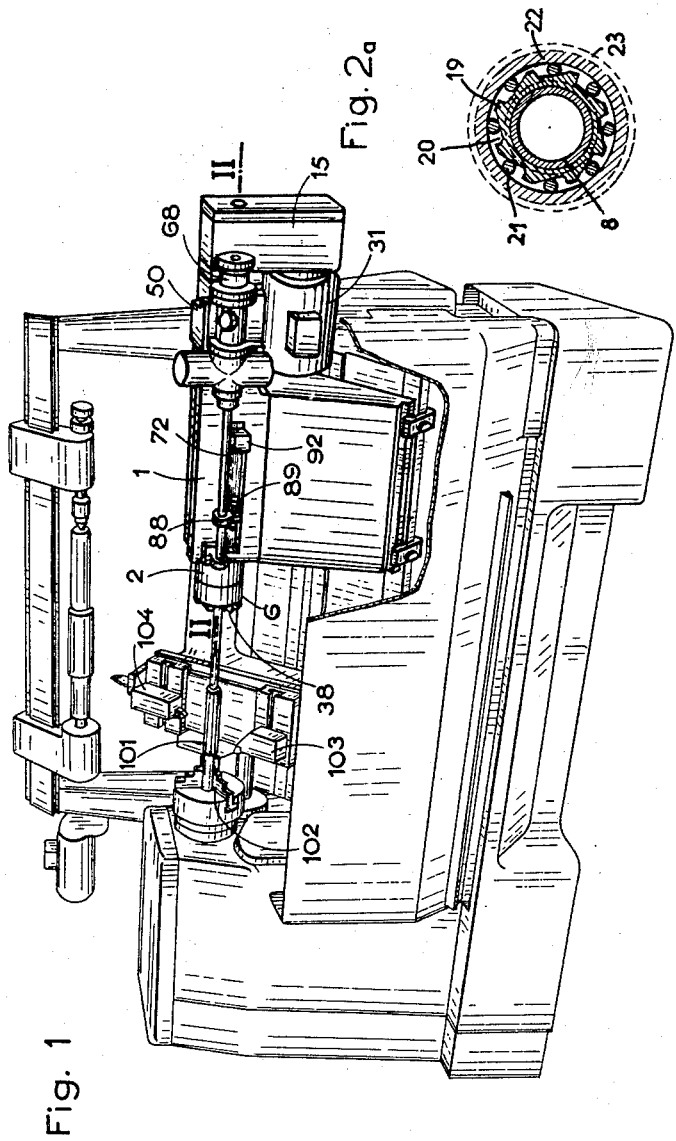
FIGURE 1 is a diagrammatic view, in perspective, of a copying lathe, equipped with apparatus according to the invention.

In known lathes adapted for operating on a bar, the latter passes through a hollow headstock and is held at the end by a tailstock.

The apparatus according to the invention, which is illustrated in FIGURES 1 to 5, is substituted for the tailstock.

The body 1 of the apparatus comprises a bore guiding a sliding sleeve 2, which does not rotate and in which is centred, by means of bearings 3 and a double-thrust roller bearing 4, a rotating spindle 5 which participates in the sliding movements of the sleeve 2. The front end of the spindle 5 carries the body 6 of a hydraulically controlled chuck, the arrangement of which will be described below. At its other end, the spindle 5 is provided with splines 7 by means of which it engages with a hollow rotary shaft 8.

At the rear of the body 1 there is fixed a plate 9 to which is secured a sleeve 10 surrounding the hollow shaft 8 and provided, at its front portion, with a shoulder 11 which, with a rear partition 12 integral with the sleeve 2, bounds an annular chamber 13. Between the partition 12 and the plate 9 there is provided an annular chamber 14 having a larger cross-section than that of the chamber 13.

The plate 9 serves as a support for a casing 15 enclosing the mechanism for driving the hollow shaft 8 in rotation. This shaft is centred in bearings 16, one pair of the bearings being supported by the casing 15 the other pair of bearings being supported by a plate 17 which is rigidly connected to the casing 15 and to which is fixed a plate 18 provided with a central aperture.

Keyed onto the shaft 8 is a free-wheel mechanism consisting of a sprocket 19 provided with ramps 20 which cooperate, through rollers 21, with a ring or outer rotatable driving sleeve 22 provided with teeth 23 and centred, by means of bearings 24, on the sprocket 19. More particularly, rollers 21 are wedged in position to provide a positive drive of shaft 8 when sleeve 22 turns in one direction and becomes unwedged when sleeve 22 rotates in the opposite direction.

The teeth 23 mesh with a pinion 25 (FIGURE 4) mounted on a shaft 26 to which is also keyed a pinion 27 in mesh with a pinion 28, in turn mounted on a shaft 29 driven in rotation by the shaft 30 of an electric motor 31 fixed to the casing 15.

The pinions 27 and 28 are accessible after the removal of the plate 18 and may be replaced by pinions of different diameters in such a manner as to obtain speeds of the spindle 5 slightly different from those of the lathe spindle.

The body 6 of the chuck is fixed to a flange 32 integral with the spindle 5 and, with the latter, bounds a cylinder 33 in which is displaced a piston 34 integral with a sleeve 35. By means of bell-crank levers 36, this piston controls the radial movement of the slides 37 supporting the jaws 38.

The cylinder 33 is supplied, on each side of the piston 34, by two conduits 39 and 40 which are in communication, through a rotating packing consisting of a ring 41 centred on the spindle 5 and a ring 42 centred in the sleeve 2, with two passages 43 and 44 provided in the sleeve. These passages lead into longitudinal grooves 45 and 46 provided on the periphery of the sleeve 2 and supplied with liquid under pressure through conduits 47 and 48 provided in the fixed body 1.

Figure 3:
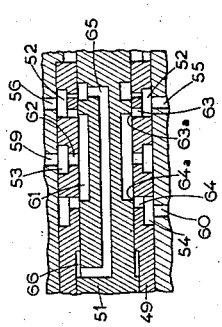
FIGURE 3 is a section on a larger scale showing in more detail the distributor for the control liquid for the apparatus.

The supplying of the chambers 13 and 14 with liquid under pressure is controlled by a distributor consisting essentially of a fixed sleeve 49 which is centred in a support 50 and in which is displaced a slide 51, shown on a larger scale in FIGURE 3.

Three annular grooves 52, 53 and 54 are provided on the periphery of the sleeve 49. The groove 52 is connected, on the one hand to an inlet conduit 55 for the liquid and on the other hand, through a passage 56, to the chamber 13. For this purpose, the passage 56 leads into the bore of the body 1 of the headstock and supplies the chamber 13 through one or more longitudinal grooves 57 and radial apertures 58 provided in the sleeve 2. The groove 53 is connected, through a conduit 59 to the chamber 14. The groove 54 is connected to a conduit 60 for the return of the liquid to the reservoir.

An annular chamber 61 is provided at the periphery of the slide 51. This chamber is always in communication, through a passage 62, with the groove 53 which supplies the chamber 14. The chamber 61 is also in communication, depending on the position occupied by the slide, either through a passage 63 with the inlet groove 52 for the liquid or through a passage 64 with the groove 54 for the evacuation of the fluid. Finally, the groove 52 is always in communication, through a conduit 65 provided in the slide 51, with an annular chamber 66.

It should be noted that in the mid position of the slide, illustrated in FIGURE 3, there is a slight overlapping between the chamber 61, on the one hand and the passages 63 and 64 on the other hand, which determines two losses of pressure 63a and 64a, the importance of which will be explained below.

Figure 2:
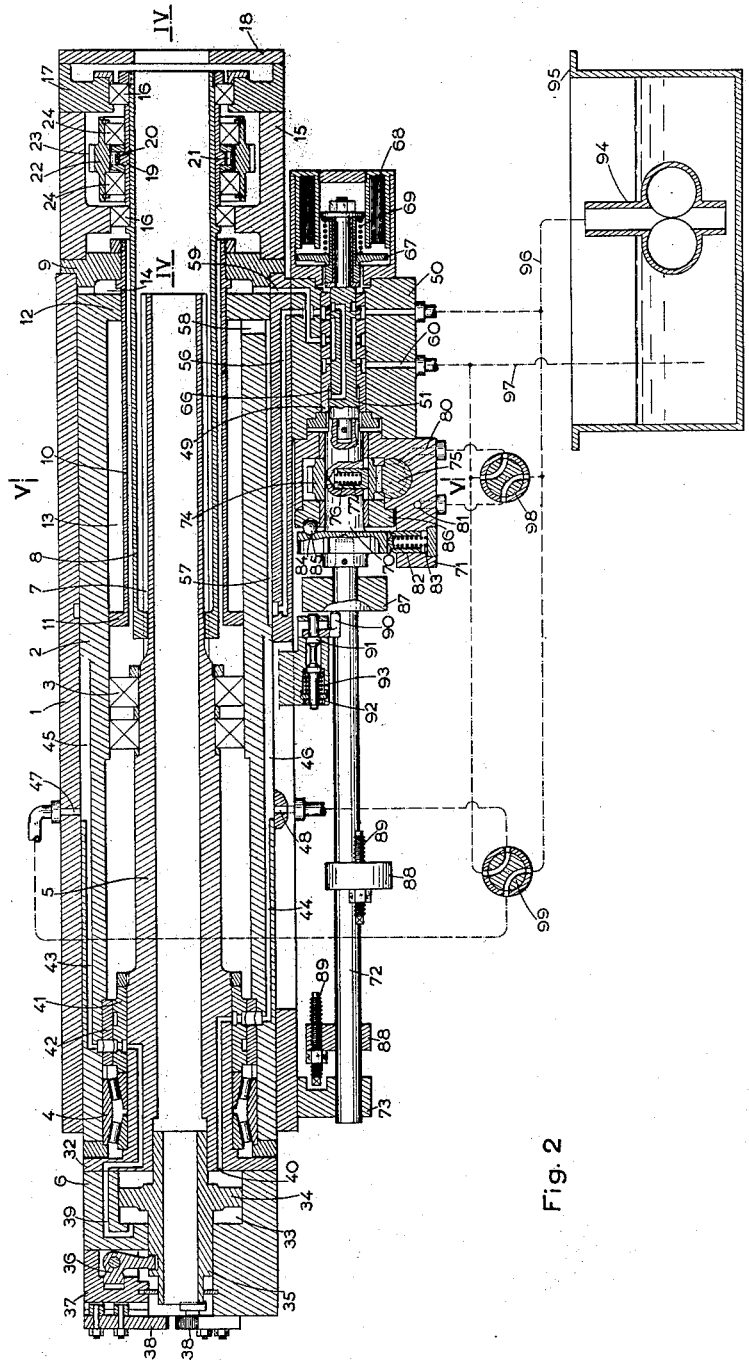
FIGURE 2 is a section through the apparatus on a longitudinal horizontal plane, along II—II, FIGURE 1.

The slide 51 is connected, at one end, to the moving armature 67 of an electro-magnet 68, by means of a spring 69 (FIGURE 2).

At the other end, the slide 51 is connected to a journal 70 centred in a fixed support 71 and in turn connected to a shaft 72 centred, at the front, in a fixed support 73.

Figure 5:
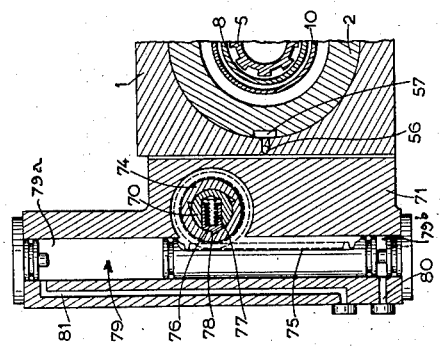
FIGURE 5 is a section on V—V, FIGURE 2.
Figure 4:
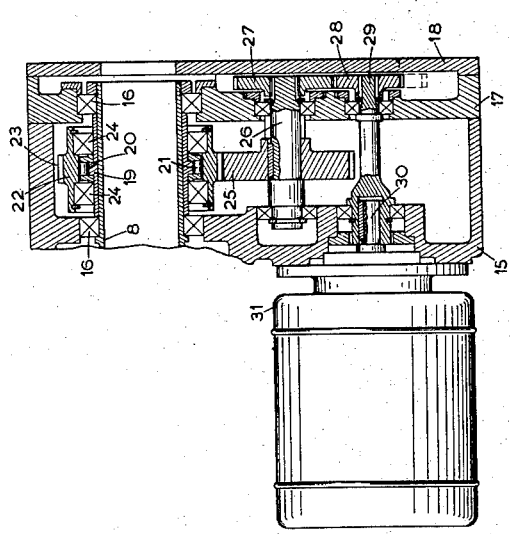
FIGURE 4 is a section on IV—IV, FIGURE 2.

Mounted on the journal 70 is a pinion 74 in mesh with a rack 75. As shown in FIGURE 5, the connection between the journal 70 and the pinion 74 is effected by means of a pawl 76 subject to the action of a spring 77 and cooperating with ratchet teeth 78 provided in the pinion in such a manner as to drive the journal 70 only in one direction of rotation of the pinion 74. The rack 75 constitutes a plunger displaced in a cylinder 79 supplied with liquid under pressure at its two ends through the passages 80 and 81. A spring catch 82 (FIGURE 2), the spring of which is shown at 83, effects a yieldable locking of the journal 70 in the various angular positions corresponding to those of the pinion 74. In each of these angular positions of the journal 70, there is provided a safety system comprising a frusto-conical cup 84 registered with a ball 85 housed in a recess provided in a ring 86 rigidly connected to the support 71.

Keyed onto the shaft 72 are a stop 87 at the rear on the one hand and a stop 88 carrying a threaded adjusting rod 89 at the front on the other hand.

Other stops, identical to the stop 88, but displaced angularly in relation thereto, may be provided, in any desired number, on the shaft 72, in front of the stop 87.

The stop 87 cooperates with a detent 90 which is mounted on a pin 91 capable of sliding in a support 92 rigidly connected to the sleeve 2 and is restored to its mid position under the influence of a spring 93. The free end of the pin 91 cooperates with the threaded adjusting rods 89 mounted on the stops 88.

The hydraulic control circuit comprises a pump 94 (FIGURE 2) which delivers liquid, taken from a reservoir 95, to a pipe 96 connected to the distributor inlet 55 (FIGURE 3), the evacuation conduit 60 of the distributor being connected through a pipe 97 to the reservoir 95.

The pipes 96 and 97 are also connected, on the one hand to a four-way valve 98 which controls the admission of the liquid to the cylinder 79 (FIG. 5) controlling the rotation of the shaft 72, and on the other hand, to a four-way valve 99 which controls the admission of the fluid to the cylinder 33 controlling the chuck.

The control of the feed and return movements of the sleeve 2 supporting the spindle 5 is effected as follows:

In the position illustrated in FIGURE 2, the slide 51 rests, under the action of the pressure in the chamber 66 and by means of the journal 70, the shaft 72 and the stop 87, on the detent 90 which abuts against the support 92 compressing the spring 93. The sleeve 2 is immobilized when the two losses of pressure 63a and 64a (FIGURE 3) create, in the two chambers 13 and 14, pressures which are inversely proportional to the effective section of said chambers.

The energizing of the electro-magnet 68 has the effect of displacing the slide 51 towards the right. The loss of pressure 64a (FIGURE 3) is eliminated and the liquid acts with the same unitary pressure in the chambers 13 and 14. The force exerted in the chamber 14 becomes preponderant and the sleeve 2 is displaced forwards, that is to say towards the left in FIGURE 2.

When the pin 91 of the detent 90 encounters the stop 88, it drives forwards, against the action of the spring 69 of the electro-magnet 68, the assembly consisting of the shaft 72, the journal 70 and the slide 51 which then shuts off the communication between the inlet for the fluid into the groove 52 and the supply groove 53 for the chamber 14, and brings the latter into communication with the groove 54 for the return to the reservoir (FIGURE 3). The pressure in the chamber 14 is reduced and the sleeve 2 tends to return to its initial position under the action of the pressure which is acting in the chamber 13. The spring 69 of the electro-magnet tends to restore towards the right the slide 51 which is finally immobilized in the position in which the forces in the two chambers 13 and 14 are in equilibrium, and the sleeve 2 is immobilized in a predetermined position.

The return of the sleeve 2 to its initial position is controlled by the de-energizing of the electro-magnet 68. Under the action of the liquid in the chamber 66, the slide 51 is displaced towards the left, bringing the chamber 14 into communication with the groove 54 for evacuating the liquid. The pressure drops in the chamber 14, and the action of the liquid, in the chamber 13, restores the sleeve 2 towards the rear. When the detent 90 comes into contact with the stop 87, it drives the slide 51 towards the right, interrupting the evacuation of the liquid and restoring the equilibrium of forces in the chambers 13 and 14, which has the effect of immobilizing the sleeve 2 in its rear position.

Since the feed stroke of the sleeve 2 is determined by the position of the stop 88, it is possible, by arranging a plurality of stops on the shaft 72, to obtain a plurality of successive stop positions for the sleeve. For this purpose, the adjusting rods 89 of the various stops are displaced angularly in relation to one another by an angle equal to that provided between the ratchet teeth 78 on the pinion 74.

The sleeve 2 having been immobilized in a first position by the pin 91 coming into contact with the adjusting rod 89 of the first stop 88 encountered, the admission of liquid under pressure to the compartment 79a of the cylinder 79 (FIGURE 5) through the operation of the valve 98 has the effect of driving the rack 75 and consequently the pinion 74 which causes the shaft 72 to turn through the angle necessary to bring the adjusting rod 89 of the following stop 88 opposite the pin 91. Any accidental feed movement of the sleeve 2 during the rotation of the shaft 72 is prevented by a movement towards the left of the slide 51, bringing the chamber 14 into temporary communication with the evacuation groove 54. This movement of the slide 51 is due to the fact that, during the rotation of the journal 70, the latter is urged forwards by the ball 85, against the action of the spring 69 of the electro-magnet, until the moment when the ball is opposite the following cup 84 provided in the journal.

This safety device or system comprising the cup 84 and ball 85 is of the type described in the French patent application filed by the applicants on May 20, 1957, on the No. PV 738,985 for "Process and Device for Manipulating a Bar in a Lathe for Machining Parts From the Bar," now French Patent 1,175,542 dated November 17, 1958.

The arrangement of the apparatus described above, permits numerous cycles of operations to be carried out, particularly that defined below and shown diagrammatically in FIGURE 6.

In the following, it will be assumed that the energizing of the electro-magnet, the locking and release of the chuck and the angular movements of the shaft with the stops are controlled by manual operations. These various operations could be controlled automatically, depending on the positions occupied by the various moving members, by means of a conventional apparatus comprising, in particular, limit contactors, electrically operated valves etc.

Figure 6:
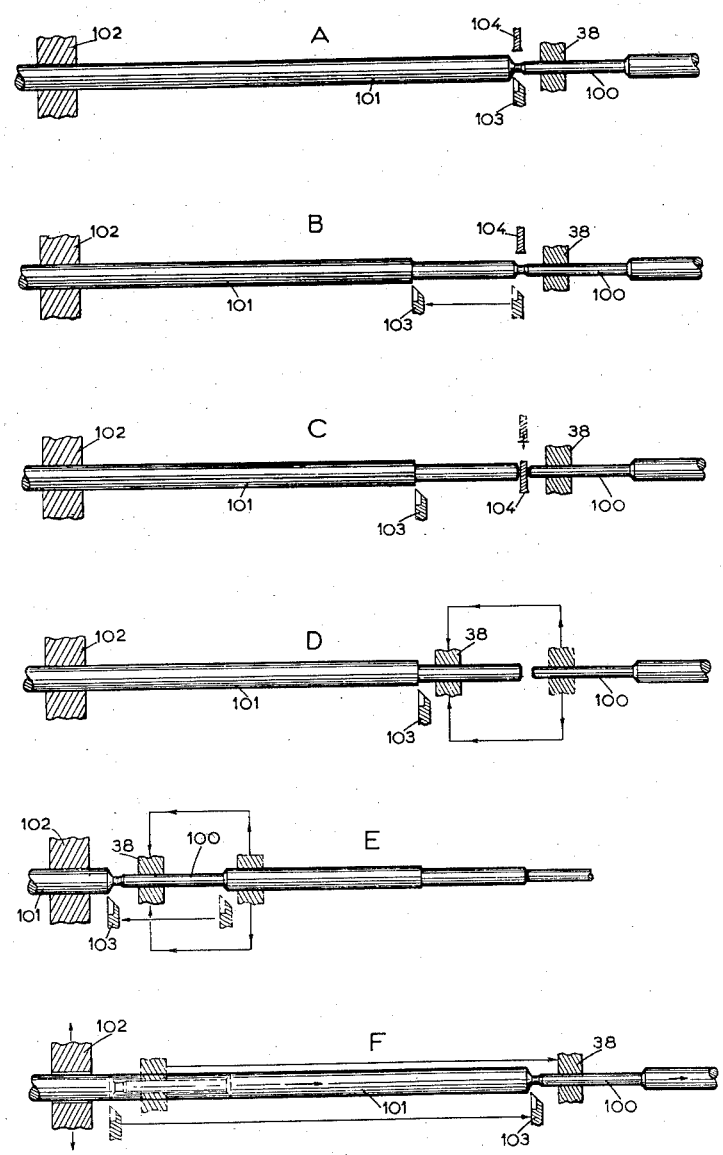
FIGURE 6 is a diagram showing a cycle of operations which can be carried out with the apparatus according to the invention.

In the position A in FIGURE 6, the jaws 38 of the mobile chuck are closed on the end of a part 100 previously machined but not yet separated from the rough bar 101. The jaws 102 of the headstock chuck of the lathe are closed on the bar 101 and drive it in rotation, together with the mobile chuck 6 which is then disconnected from its own drive by the action of the free wheel mechanism and rotates at the speed given to this drive.

The traversing tool 103 and the parting-off tool 104 are shown in position for the start of the cycle.

When the traversing tool 103 has effected the machining of the bar 101 over a given length (position B), the parting-off tool 104 separates the part 100 from the bar (position C); the free wheel mechanism is clutched and the parting-off tool removes the stub ends from the two separated members driven independently of one another.

After the withdrawal of the parting-off tool, the jaws 38 of the mobile chuck are opened, by reversing the liquid pressure in the chuck by means of the valve 99 actuated by any suitable means and the energizing of the electro-magnet 68 causes the advance of the sleeve as far as the first stop provided on the shaft 72; when the sleeve has been hydraulically locked in this position, the chuck 38 is again closed on the portion which has just been machined, and supports the bar in the vicinity of the traversing tool (position D). It will be noted that the circumferential slip between the bar 101 and the jaws of the chuck 38 is very slight at the moment when the jaws are closed because the chuck is driven in rotation at a speed similar to that of the bar.

In the same manner, after each traversing operation, the mobile chuck is locked onto the portion which has just been machined, the successive advance movements of the sleeve being controlled by the suitably spaced stops on the bar 72 and brought into action successively by the periodic rotations of the said bar (positions E and F).

At the end of the last traversing operation, the jaws 102 of the spindle chuck of the lathe are opened (position F) and the de-energizing of the electro-magnet then causes the return of the closed mobile chuck 38, to its initial position (position A) taking the bar with it, the distance of the return travel being determined exactly by the hydraulic locking of the sleeve. The end of the bar which has already been parted off has come into contact with the part previously machined and pushed it back towards the rear of the apparatus, on leaving which the parts can be collected one after the other.

The invention is in no way limited to the embodiment described and illustrated; it is capable of numerous modifications, available to one skilled in the art, without departing from the spirit of the invention as defined by the following claims.

What I claim is:

1. In a machine tool having a head stock provided with a rotary chuck for holding a work piece and a tool slide structure, a tail stock including a rotary and axially movable hollow spindle adapted to receive said work piece, a gripping device carried by said spindle and including radially movable work-engaging members, and means for operating said gripping device into and out of operative position, the improvement comprising fluid-operated means to move said spindle lengthwise toward and away from said chuck, a valve mechanism including a movable valve actuating element for controlling the flow of fluid toward and from said fluid operated means, a stop member mounted on said spindle, a rotatable and axially movable shaft operatively connected with said valve actuating element for axial movement therewith, a plurality of axially and circumferentially spaced abutment members on said shaft, and means to rotate said shaft so as to move said abutment members into successive alignment with said stop member to thereby establish predetermined limits of advance movement of said spindle and consequently of said gripping device toward said chuck.

2. In a machine tool having a head stock provided with a rotary chuck for holding a piece of work and a tool slide structure, a tail stock, a rotary and axially movable hollow spindle in said tail stock adapted to receive said workpiece, a gripping device carried by said spindle and including radially movable work-engaging members to support temporarily the workpiece and rotate therewith, and means for operating said gripping device into and out of operative position, the improvement comprising fluid-operated means to move said spindle lengthwise toward and away from said chuck, a valve mechanism including a movable valve actuating element for controlling the flow of fluid toward and from said fluid operated means, coordinated abutment means on said spindle and said valve actuating element effective to establish predetermined limits of advance movement of said spindle toward said chuck, a motor, a driving connection between said spindle and said motor for rotating said spindle by said motor, and a free wheel mechanism in said driving connection.

3. In a machine tool having a head stock provided with a rotary chuck for releasably holding a piece of work, a tail stock, and a tool slide structure between said head stock and said tail stock, the improvement comprising a rotary and axially movable hollow spindle in said tail stock adapted to receive said workpiece, a gripping device carried by said spindle and including radially movable work-engaging members to grip and support said workpiece, a fluid-operated means to move said spindle lengthwise toward and away from said chuck, a valve mechanism for controlling the flow of fluid toward and from said fluid-operated means, means for operating said gripping device into and out of operative position, and control means for said valve mechanism for causing said spindle to move toward said chuck when the latter holds said piece of work and said gripping device is in inoperative position, and for causing said spindle to move away from said chuck when said gripping device is in operative position and said piece of work released from said chuck.

References Cited in the file of this patent
UNITED STATES PATENTS

| | | |
|---|---|---|
| 1,912,515 | Davenport | June 6, 1933 |
| 2,377,383 | Slovak | June 5 1945 |
| 2,561,035 | Robichaud | July 17, 1951 |